United States Patent [19]

Nickel et al.

[11] Patent Number: 5,447,131
[45] Date of Patent: Sep. 5, 1995

[54] IGNITION CIRCUIT FOR AN INTERNAL COMBUSTION ENGINE

[75] Inventors: Hans Nickel, Cottenweiler; Thomas Schuster, Waiblingen; Michael Wissmann, Mettmann, all of Germany

[73] Assignee: Andreas Stihl, Waiblingen, Germany

[21] Appl. No.: 285,303

[22] Filed: Aug. 3, 1994

[30] Foreign Application Priority Data

Aug. 3, 1993 [DE] Germany .................. 43 26 010.1

[51] Int. Cl.⁶ .............................................. F02P 9/00
[52] U.S. Cl. ................................................ 123/335
[58] Field of Search ............. 123/335, 339.6, 418, 123/416, 198 D, 630, 632; 307/10.1; 364/431

[56] References Cited

U.S. PATENT DOCUMENTS

| | | | |
|---|---|---|---|
| 4,812,671 | 3/1989 | Furrow | 307/10.1 |
| 4,979,477 | 12/1990 | Nickel et al. | 123/335 |
| 5,105,783 | 4/1992 | Nussbaum et al. | 123/335 |
| 5,138,996 | 8/1992 | Fiorenza, II | 123/335 |
| 5,208,519 | 5/1993 | Dykstra et al. | 123/335 |
| 5,245,965 | 9/1993 | Andersson | 123/335 |
| 5,385,128 | 1/1995 | Kratt et al. | 123/335 |

*Primary Examiner*—Raymond A. Nelli
*Attorney, Agent, or Firm*—Walter Ottensen

[57] ABSTRACT

The invention is directed to an ignition circuit for an internal combustion engine in a portable handheld work apparatus wherein a work tool is driven via a clutch. The ignition circuit includes an ignition time point control which connects a spark plug via a switch to a voltage source in order to trigger an ignition spark. The spark plug is mounted in the combustion chamber of the engine. This connection takes place in dependence upon the crankshaft angle and the rpm of the engine. In order to prevent damage to the clutch because of a blocked work tool, a test value counter driven via a rpm gate circuit is provided. The test value counter increments its value in the pregiven rpm window of the gate circuit with each rotation of the crankshaft and the content of the test value counter is compared to a pregiven limit value by a comparator. The output of the comparator activates a rpm-reducing protective circuit and the output of the comparator indicates reaching or exceeding the limit value.

12 Claims, 2 Drawing Sheets

IGNITION CIRCUIT FOR AN INTERNAL COMBUSTION ENGINE

FIELD OF THE INVENTION

The invention relates to an ignition circuit for an internal combustion engine such as a two-stroke engine of a portable handheld work apparatus such as a motor-driven chain saw or the like.

BACKGROUND OF THE INVENTION

U.S. Pat. No. 4,979,477 discloses an ignition circuit of the kind referred to above wherein the ignition time point is computed in dependence upon external operating parameters or is read out of a memory in order to obtain an optimal ignition adapted to rpm. If the work tool becomes blocked in the full-load position, the clutch slips and the rpm drops notwithstanding the full-load position of the throttle lever. Because of the load position of the throttle lever, the ignition circuit changes the ignition time point in the direction of an increase of rpm so that the engine rotates for a longer time at an actual rpm higher than the clutch-engaging rpm although the work tool is at standstill. The danger is then present that the slipping clutch will become thermally overheated and inoperable; at the very least, an operating state of this kind is very wear-intensive to the friction coatings.

SUMMARY OF THE INVENTION

It is an object of the invention to provide an ignition circuit which is improved so that thermal overload of the centrifugal clutch connecting the work tool to the engine is reliably avoided.

The ignition circuit of the invention is for an internal combustion engine such as a two-stroke engine mounted in a portable handheld work apparatus having a work tool driven by the engine via a centrifugal clutch. The engine has a cylinder and a piston conjointly defining a combustion chamber and a crankshaft connected to the piston. The ignition circuit includes: a spark plug mounted in the cylinder; a voltage source; an ignition switch actuable between an on-condition wherein the voltage source is connected to the spark plug for initiating a spark ignition in the chamber and an off-condition wherein the voltage source is disconnected from the spark plug; an electronic control circuit for controlling the time point at which the ignition takes place and for actuating the ignition switch between said conditions in dependence upon the angular position of the crankshaft and the rpm of the engine; the electronic control circuit includes: a rpm gate circuit defining a predetermined rpm window; a test value counter driven by the rpm gate circuit and having a test value which the test value counter increments with each revolution of the crankshaft when the rpm is within the window; a comparator for comparing the test value of the test value counter to a pregiven limit value and for emitting an output when the test value is equal to or greater than the limit value; and, protection circuit means for reducing the rpm of the engine in response to the output.

The critical rpm range can be determined via the rpm gate circuit. This critical rpm range can occur when the work tool is blocked, the centrifugal clutch is slipping and for the full-load position. The test value counter increments its value for each crankshaft revolution insofar as the determined actual rpm lies within the rpm window of the gate circuit. If the content of the test value counter exceeds a pregiven limit value, then a rpm dropping protection circuit is activated so that the rpm drops below the clutch-engaging rpm of the centrifugal clutch notwithstanding the full-load position of the throttle lever. The rpm drops below that value which separates the blocked work tool from the rotating drive motor. A thermal overload of the clutch is avoided.

Preferably, the protection circuit switches the ignition off above the idle rpm so that a rapid drop in rpm is obtained. A rpm-accelerating ignition time point is switched during a pregiven number of crankshaft revolutions before switching off the ignition so that a switchoff does not occur immediately for a briefly blocked work tool and slippage of the clutch. In practice, it has been shown that a short blockage of the work tool is often unavoidable. The protection circuit then intervenes to reduce rpm only after a specific number of crankshaft revolutions have occurred.

If the operator switches the engine back to idle, then (preferably after an idle rpm is determined during several crankshaft revolutions) a cutoff switch is actuated which deactivates the protection circuit. The work tool is then again operationally ready.

The cutoff switch is only actuated when the idle rpm is present for several crankshaft revolutions in order to guarantee that the engine will again run up in rpm when the work tool is unblocked and the protection circuit is activated without releasing the throttle lever. The idle rpm is only present for one or two crankshaft revolutions when the ignition is switched off and the engine is thereafter accelerated because of the depressed gas lever. For this reason, and before a renewed switchoff of the ignition, a rpm-accelerating ignition time point is switched during a pregiven number of crankshaft revolutions. If the work tool has become unblocked, then the engine runs up again to high rpm during this pregiven number of crankshaft revolutions so that the then present actual rpm lies outside of the rpm window.

Preferably, the actual rpm, which is within the rpm window, is monitored by a comparator which branches off into a load detection circuit when there is a drop below a limit rpm. This load detection circuit computes the rpm difference between the actual crankshaft rpm and the immediately preceding crankshaft rpm. This rpm difference is compared to a pregiven value and when the pregiven value is exceeded, the ignition time point control triggers an ignition time point corresponding to the load condition.

Monitoring of the rpm difference from one crankshaft revolution to the next crankshaft revolution ensures an early detection of a desired runup of the engine so that a rapid powerful runup of the engine is obtained by an immediate switchover to an ignition time point corresponding to the load condition.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
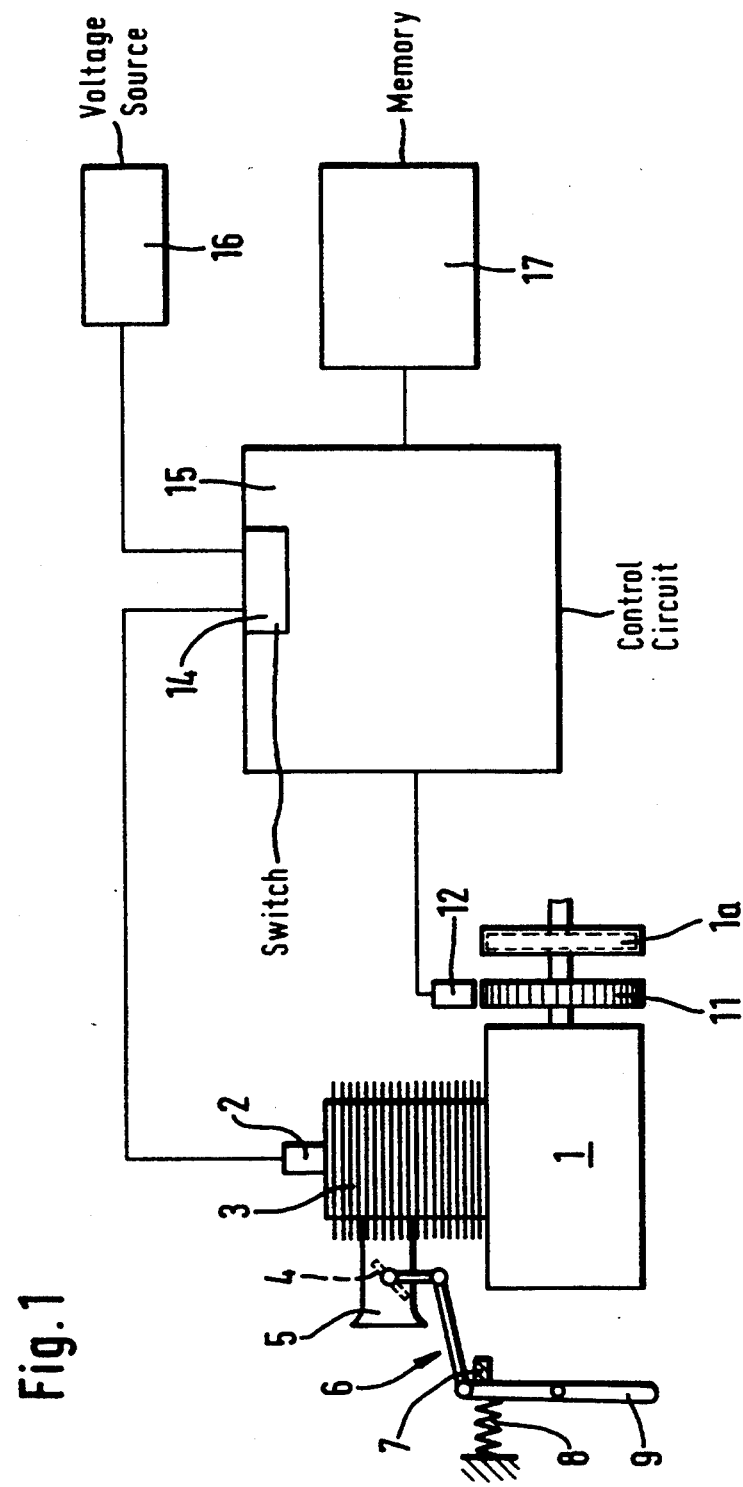
FIG. 1 is a schematic of the ignition circuit according to the invention on a two-stroke engine; and, FIG. 2 is a flowchart of the ignition time point control pursuant to the invention.

The ignition circuit shown in FIG. 1 is provided for an internal combustion engine 1 which, for example, can be mounted in a handheld portable work apparatus such as a motor-driven chain saw or the like. In the embodiment shown, the engine is especially an air-cooled two-stroke engine and drives a work tool (not shown) via a centrifugal clutch.

The engine 1 has an intake pipe 5 with a carburetor and a throttle flap 4 mounted therein. The throttle flap is actuated by a throttle lever 9 via a linkage 6 in order to change the rpm of the engine. In the idle position shown, the throttle lever 9 lies against a stop 7 under the action of a spring 8.

A pulse transmitter wheel 11 rotates with the crankshaft of the engine. The wheel 11 has marks at its outer periphery which generate pulses in a rpm sensor 12 coacting with the wheel 11. These pulses are supplied to a control circuit 15 as a rpm data signal. The marks on the pulse transmitter wheel 11 are arranged in such a manner that, for each crankshaft revolution, a signal specific to the crankshaft position is generated in the rpm sensor 12 wherefrom the control circuit 15 detects the actual position of the crankshaft. Preferably, the marks are arranged over the periphery of the wheel 11 at different spacings so that the angular position of the crankshaft can be determined from the spacing of the pulses at the output of the rpm sensor 12. An arrangement of marks at equidistant spaces over the periphery of the wheel is also suitable. A larger gap is provided for rpm detection by leaving out a mark.

Advantageously, only those pulse signals are evaluated for determining the actual rpm (n) of the engine which are emitted by the sensor 12 over the crankshaft periphery in the range of 45° crankshaft angle (CA) forward of bottom dead center to 45° CA after bottom dead center. In this way, the long delay occurring because of compression and the rapid acceleration of the rpm occurring because of the ignition can be masked out.

The control circuit 15 is configured as an electronic circuit and preferably includes a microprocessor which processes the signals of the rpm sensor 12 and correspondingly controls a switch 14 (especially a transistor or a thyristor) in order to conduct energy to a spark plug 2 mounted on the cylinder 3 of the engine 1. The energy is necessary for generating an ignition spark emitted in the combustion chamber and is provided by a voltage source 16.

Figure 2:
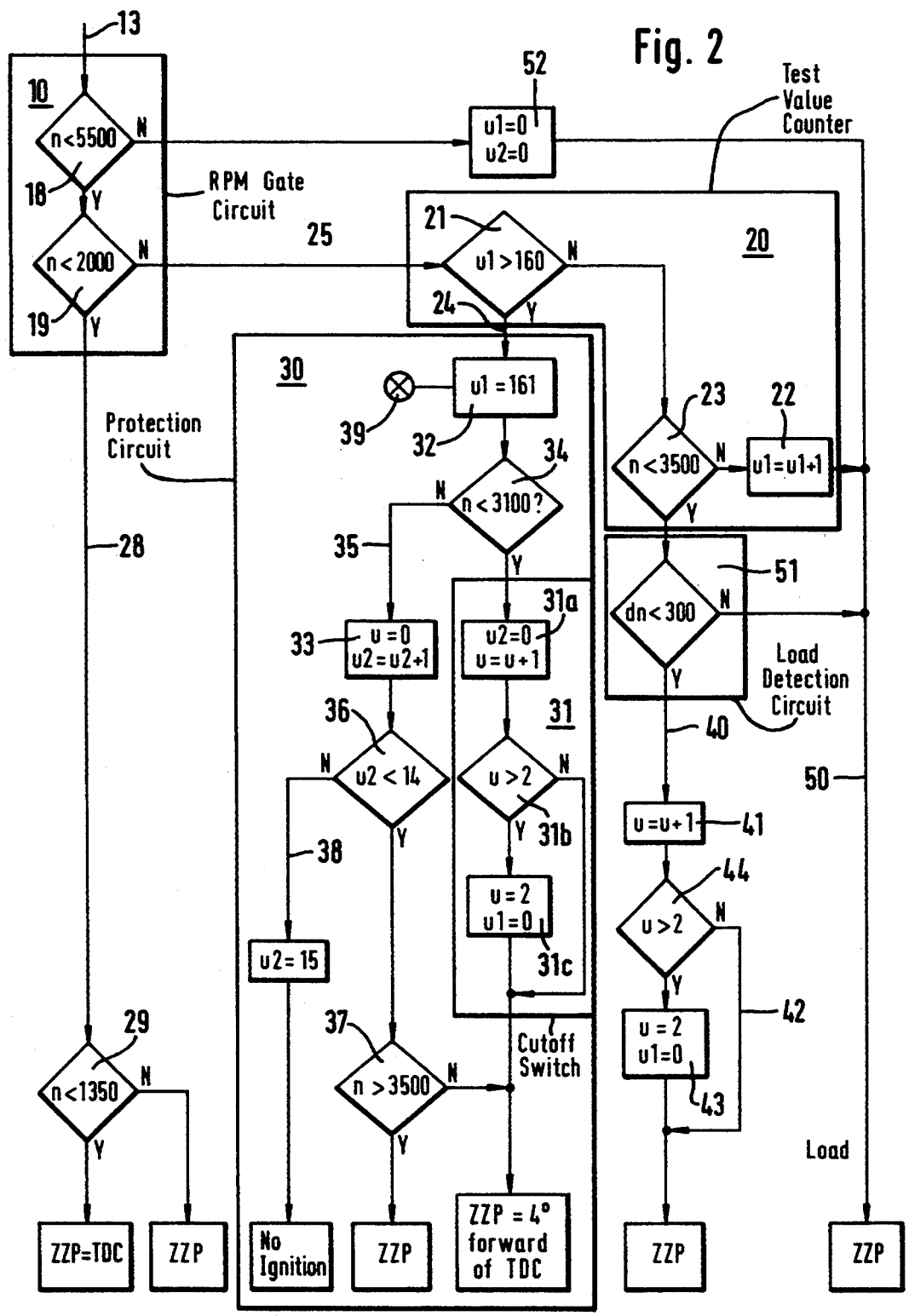

The ignition time point control of the microprocessor processes the signals and is shown in the flowchart of FIG. 2. The ignition time point control can also be in the form of an electronic circuit having discrete components.

The microprocessor is connected to a memory 17 in which especially different curves are stored of the ignition time point ZZP plotted as a function of rpm (n). Constants are also stored in memory 17 which are necessary in certain operating phases for the computation of the ignition time points. Such a computation of ignition time points is described in detail in U.S. Pat. No. 4,979,477 incorporated herein by reference. The control of the rpm (n) can then be carried out so that the ignition is suppressed for one or more crankshaft revolutions.

The flowchart shown in FIG. 2 is run through for each crankshaft rotation in order to provide the ignition time point ZZP, which corresponds to the particular operating state of the engine, for each revolution of the crankshaft.

With the start of the rotation of the crankshaft, the determination of the ignition time point is made which corresponds to the operating conditions present for this crankshaft rotation. The actual rpm value is supplied to a first comparator 18 of a rpm gate circuit 10 via the input 13 and is compared to a rpm $n_{max}=5,500$. Since the rpm at the start is less than $n_{max}$, a branchoff is made to a second comparator 19 wherein a comparison is made to a rpm $n_{min}=2,000$. Because the actual rpm is below the rpm value $n_{min}$, a comparator 29 is driven via a start branch 28 and this comparator compares the actual rpm to the limit rpm of 1,350 rpm. If the actual rpm is less than the limit rpm, then ignition takes place at an ignition time point ZZP=TDC lying at top dead center of the piston. If the actual rpm exceeds the limit rpm, then an ignition takes place at the time point ZZP which is read out of the memory 17.

After startup of the engine, an idle rpm of approximately 3,000 rpm settles in which lies within the rpm window of the gate circuit 10 which, for this reason, branches via the output 25 to a test value counter 20. The rpm window is determined by the rpms $n_{max}$ and $n_{min}$. A comparison to a coupling limit value $n_K=3,500$ rpm is made in a comparator 23 in the test value counter 20. Because the idle rpm at approximately 3,000 rpm is less than the coupling limit rpm $n_K$, a branch to a load detection circuit 51 takes place which computes the rpm difference between the actual crankshaft rpm and the immediately preceding crankshaft rpm and compares this difference to a difference limit value dn which is set in the embodiment at 300 rpm. When the pregiven rpm difference dn is exceeded, a branch into the load branch 50 immediately takes place so that an ignition time point ZZP corresponding to the load is read out of the memory. The rpm difference, which can be determined from two sequential crankshaft rotations, is an indicator for the actuation of the throttle lever by the operator. If this rpm difference increases greatly, especially in a jump-like manner, then the premise can be taken that the operator has depressed the throttle lever. A switchover then takes place directly into the load branch 50 to an ignition time point which ensures a rapid and powerful runup of the engine.

If the comparator of the load detection circuit 51 determines that the rpm difference dn is not exceeded, then an idle branch 40 is run through since the premise can be taken that idle conditions are present. In the idle branch 40, a counting stage 41 is provided for a loop counting mark (u) which increments by one with each runthrough of the idle branch 40 and is compared to a pregiven value in a comparator 44. In the embodiment, the pregiven value is "2". If the loop counting mark reaches the value "3", the loop counting mark is set via a setting device 43 to u=2 and, at the same time, the test value u1 of the test value counter 20 is set to zero. As long as the loop counting mark (u) is less than "3", the comparator 44 branches into a branch 42 bypassing the setting device 43. In each case, ignition takes place with a computed ignition time point ZZP for a runthrough of the idle branch 40.

If a rpm greater than the clutch limit rpm $n_K$ is determined during a rpm comparison in the comparator 23 of the test value counter 20, then the comparator 23 branches to the counter stage 22 which increments the test value u1 by "1" and then continues into the load branch 50 so that the ignition takes place at an ignition time point read out of the memory 17.

For each runthrough of the test value counter 20, the value u1 is compared to a pregiven limit value in the comparator 21 shown as a decision block. The limit value has the value "160" in the embodiment. If the ignition time point control determines via the test value counter 20 that a rpm between 3,500 rpm and 5,500 rpm is present for more than "160" crankshaft rotations, then this can be an indication that the work apparatus is operating with a blocked work tool and the engine at full load. The centrifugal clutch 1a slips in a situation of this kind. In order to avoid destroying the clutch and also other components because of possible frictional heat, the output 24 of the test value counter 20 drives a protective circuit 30 which is activated to reduce the actual rpm.

The actual rpm is dropped to a value below the clutch limit rpm when the protection circuit 30 is activated so that the centrifugal clutch is decoupled. A switchoff of the protection circuit and therefore a runup to the load rpm is only then possible when the throttle lever remains depressed and the work tool again becomes free or the throttle lever is released.

After driving the protection circuit 30, the test value u1 is fixed to u1=161 for reasons of safety via the setting device 32. With the setting of this test value, preferably a control lamp 39 is activated which indicates to the user that notwithstanding full load (depressed throttle lever) required by the user, the engine 1 is controlled downwardly in speed in order to protect the slipping centrifugal clutch.

With a following comparator 34, a determination is made in the protection circuit as to whether the actual rpm (n) is below a pregiven idle limit rpm LD of 3,100 rpm. If this is not the case, then a branching via the output 35 to a counting stage 33 takes place. The loop counting mark u2 of the counting stage 33 is incremented by "1" with every runthrough of the output 35. The value of the counting stage 33 is compared via a comparator 36 to a limit mark which has the value "14" in the embodiment shown. As long as the loop counting mark u2 is less than "14", ignition takes place with an ignition time point ZZP read out the memory 17. The engine attempts to accelerate.

In the case of an actual rpm of less than 3,500 rpm, a branch to an ignition time point ZZP takes place by means of a comparator 37. This ignition time ZZP lies 4° CA forward of top dead center.

If the loop counting mark u2 of the counter stage 33 is at the value "14" and the engine does not reach a higher rpm notwithstanding a corresponding ignition, then the work tool is blocked. A branchoff to the branch 38 is made wherein, for reasons of safety, the loop counting mark u2 is set to the value count "15". Furthermore, the ignition is completely suppressed so that the actual rpm falls rapidly below the idle limit rpm LD. The centrifugal clutch is decoupled. The comparator 34 now branches to a cutoff switch 31 via which an accelerating ignition time point ZZP=4° CA before top dead center is driven to. The cutoff switch 31 includes a counter stage 31a having a loop counting mark u which increments with each passthrough of the cutoff switch 31. The loop counting mark u2 of the counter stage 33 is decremented to "zero" with each passthrough of the cutoff switch 31.

If the loop counting mark u of the cutoff switch 31 is less than "2", then ignition takes place directly at the ignition time point 4° CA forward of top dead center so that (for a throttle lever which continues to be depressed) the rpm again increases. The rpm increases to over 3,100 rpm with the next crankshaft revolution at the latest so that the counter stage 33 is driven again via the output 35. In the next cycle, for a maximum of 15 crankshaft revolutions, ignition again takes place at an ignition time point ZZP read out of the memory. If the work tool has become free in the meantime, then the actual rpm increases to over 5,500 rpm so that the gate circuit 10 branches via the setting device 52 to load branch 50. In the setting device 52, the marks u1 and u2 are reset to "0". The protection circuit 30 is deactivated and monitors anew as to whether the actual rpm drops into the critical rpm range between 3,500 and 5,500 rpm.

Should the work tool continue to be blocked when the counter stage 33 is again run through (which must be assumed when reaching the value u=14), the ignition is again switched on, the cutoff switch 31 driven and ignition again takes place at an ignition time point 4° CA ahead of top dead center. The rpm increases to over 3,100 rpm and the counter stage 33 is again run through. This back and forth guarantees a continuous check as to whether the work tool has become free or not.

The activated protection circuit 30 can also, however, be deactivated in another way. If the throttle lever is released, then the actual rpm drops to an idle rpm of approximately 3,000 rpm. The cutoff switch 31 is driven via the comparator 34 and a check is made in the comparator 31b as to whether the loop counting mark u is greater than a pregiven value which, in the embodiment, is specified as "2". Thereafter, ignition takes place at the ignition time point ZZP=4° CA ahead of top dead center. Since the throttle lever is not depressed, the rpm will not climb so that a branch off into the cutoff switch takes place also in the next crankshaft revolution. If the idle rpm continues in three sequential crankshaft revolutions because of a released throttle lever, then the mark "u" reaches the value "2" and the comparator 31b branches to a setting device 31c which sets the loop counting mark to u=2 for reasons of safety and the test value u1 of the test value counter 20 is reset to "zero". If there is a runthrough of the cutoff switch 31 for more than three times, then the released throttle lever and therefore the idle conditions which are present are detected. The protection circuit 30 is reset to the initial state by setting the mark u of the test value counter 20 to zero.

It is understood that the foregoing description is that of the preferred embodiments of the invention and that various changes and modifications may be made thereto without departing from the spirit and scope of the invention as defined in the appended claims.

What is claimed is:

1. An ignition circuit for an internal combustion engine such as a two-stroke engine mounted in a portable handheld work apparatus having a work tool driven by the engine via a centrifugal clutch, the engine having a cylinder and a piston conjointly defining a combustion chamber and a crankshaft connected to the piston, the ignition circuit comprising:

a spark plug mounted in the cylinder;
a voltage source;
an ignition switch actuable between an on-condition
  wherein said voltage source is connected to said spark plug for initiating a spark ignition in said chamber and an off-condition wherein said voltage source is disconnected from said spark plug;

an electronic control circuit for controlling the time point at which said ignition takes place and for actuating said ignition switch between said conditions in dependence upon the angular position of the crankshaft and the rpm of the engine;

said electronic control circuit including:

a rpm gate circuit defining a predetermined rpm window;

a test value counter driven by said rpm gate circuit and having a test value which said test value counter increments with each revolution of said crankshaft when said rpm is within said window;

a comparator for comparing the test value of said test value counter to a pregiven limit value and for emitting an output when said test value is equal to or greater than said limit value; and, protection circuit means for reducing the rpm of said engine in response to said output.

2. The ignition circuit of claim 1, wherein said predetermined rpm window is determined by the lower and upper limit rpms of said centrifugal clutch which slips when the work tool is blocked.

3. The ignition circuit of claim 2, wherein said protection circuit includes means for switching off the ignition above an idle rpm.

4. The ignition circuit of claim 3, wherein said protection circuit includes means for switching an rpm accelerating ignition time point during a pregiven number of crankshaft revolutions before switching off the ignition.

5. The ignition circuit of claim 4, wherein said protection circuit includes a cutoff switch for deactivating said protection circuit; and, means for actuating said cutoff switch when said rpm is below an idle rpm.

6. The ignition circuit of claim 5, wherein said electronic control circuit includes means for resetting said test value counter when said cutoff switch is actuated.

7. The ignition circuit of claim 6, wherein the idle rpm is present over several crankshaft revolutions before said cutoff switch is actuated.

8. The ignition circuit of claim 7, said protection circuit including a counting stage for detecting the number of crankshaft revolutions.

9. The ignition circuit of claim 1, further comprising a load detection circuit; said comparator being a first comparator of said test value counter; and, said test value counter including a second comparator for monitoring the actual rpm of said crankshaft lying within said predetermined rpm window and for branching into said load detection circuit when said rpm of said crankshaft drops below a limit rpm; and, said load detection circuit being adapted to compute the rpm difference between said actual rpm of said crankshaft and the directly previous crankshaft rpm; and, said electronic control circuit further including means for driving said ignition switch at an ignition time point which corresponds to a load when said rpm difference exceeds a pregiven rpm difference (dn).

10. The ignition circuit of claim 9, further comprising means for resetting said test value counter when said rpm difference drops below said pregiven rpm difference (dn) a pregiven number of times.

11. The ignition circuit of claim 10, further comprising an indicator; and, said protection circuit being adapted for driving said indicator.

12. The ignition circuit of claim 11, said indicator being a control lamp and said protection circuit being adapted to drive said control lamp intermittently.

* * * * *